(12) United States Patent
Weber et al.

(10) Patent No.: US 8,599,483 B1
(45) Date of Patent: Dec. 3, 2013

(54) HIGH ANGLE REAR PROJECTION SYSTEM

(75) Inventors: Brian T. Weber, Saint Paul, MN (US);
Rolf W. Biernath, Wyoming, MN (US);
John C. Schultz, Afton, MN (US); Gary T. Boyd, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/488,806

(22) Filed: Jun. 5, 2012

(51) Int. Cl.
*G03B 21/60* (2006.01)
*G03B 21/56* (2006.01)
*G03B 21/28* (2006.01)

(52) U.S. Cl.
USPC ............ 359/449; 359/443; 359/457; 359/460

(58) Field of Classification Search
CPC ................................ G03B 21/56; H01L 27/00
USPC ................ 250/208.1; 359/443, 449, 460, 457
See application file for complete search history.

(56) References Cited

U.S. PATENT DOCUMENTS

| | | | |
|---|---|---|---|
| 3,712,707 A * | 1/1973 | Henkes, Jr. .................... | 359/448 |
| 4,729,631 A | 3/1988 | Takahashi | |
| 6,466,368 B1 | 10/2002 | Piepel | |
| 6,483,643 B1 * | 11/2002 | Zuchowski .................... | 359/443 |
| 6,597,501 B2 | 7/2003 | Lambert | |
| 6,631,030 B2 * | 10/2003 | Stevenson et al. ............. | 359/452 |
| 6,870,670 B2 * | 3/2005 | Gehring et al. ................ | 359/443 |
| 6,950,234 B1 * | 9/2005 | Onishi ............................ | 359/449 |
| 7,057,810 B2 | 6/2006 | Thomas | |
| 7,184,210 B2 | 2/2007 | Thomas | |
| 7,277,227 B2 | 10/2007 | Sekiguchi | |
| 7,339,733 B2 * | 3/2008 | Hirose et al. .................. | 359/457 |
| 7,551,352 B2 * | 6/2009 | Ohishi et al. .................. | 359/460 |
| 7,841,728 B2 * | 11/2010 | Morikuni et al. ............... | 353/99 |
| 7,923,675 B2 * | 4/2011 | Tanis-Likkel et al. ...... | 250/208.1 |
| 8,193,480 B2 * | 6/2012 | Tanis-Likkel et al. ...... | 250/208.1 |
| 2004/0057110 A1 * | 3/2004 | Adachi et al. ................. | 359/453 |
| 2004/0257533 A1 | 12/2004 | Veligdan | |
| 2005/0174636 A1 | 8/2005 | Yoshikawa | |
| 2006/0007536 A1 | 1/2006 | Huang | |
| 2006/0066945 A1 | 3/2006 | Yeo | |
| 2006/0171027 A1 | 8/2006 | Shinbo | |

(Continued)

FOREIGN PATENT DOCUMENTS

| | | |
|---|---|---|
| JP | 62249134 | 10/1987 |
| JP | 2007-148068 | 6/2007 |

(Continued)

OTHER PUBLICATIONS

Data Sheet for Vikuiti Rear Projection Film (Oct. 2006), 6 pages.

(Continued)

*Primary Examiner* — Clayton E Laballe
*Assistant Examiner* — Kevin Butler

(57) ABSTRACT

A system for projecting content at an angle to a rear projection screen. The system includes a projector configured for projecting changeable electronic content and a rear projection screen for receiving the projected content at an angle and displaying the projected content. The rear projection screen includes a turning film having prisms facing toward or away from the projector. For prisms facing toward the projector, a protective film covers the turning film. When the projected content is displayed on the rear projection screen, the content has a substantially uniform appearance.

19 Claims, 5 Drawing Sheets

(56) References Cited

U.S. PATENT DOCUMENTS

| | | |
|---|---|---|
| 2006/0256433 A1 | 11/2006 | Yoshikawa |
| 2007/0091466 A1 | 4/2007 | Schubert |
| 2008/0304018 A1* | 12/2008 | Tanis-Likkel et al. .......... 353/30 |
| 2011/0020640 A1* | 1/2011 | Sherman et al. .............. 428/343 |
| 2011/0075114 A1* | 3/2011 | Tanis-Likkel et al. .......... 353/97 |
| 2011/0126968 A1* | 6/2011 | Determan et al. ............ 156/229 |
| 2011/0253301 A1* | 10/2011 | Yamanaka et al. ............ 156/247 |
| 2012/0064304 A1* | 3/2012 | Bharti et al. .................. 428/189 |
| 2012/0236268 A1* | 9/2012 | Tanis-Likkel et al. .......... 353/97 |

FOREIGN PATENT DOCUMENTS

| | | | |
|---|---|---|---|
| JP | 2007-219057 | * 8/2007 | ............ G03B 21/56 |
| WO | WO 2005-106567 | 11/2005 | |
| WO | WO 2006-054056 | 5/2006 | |

OTHER PUBLICATIONS

U.S. Appl. No. 13/407,053, "Shaped Rear Projection Screen with Shaped Fresnel Lens Sheet," filed Feb. 28, 2012.

* cited by examiner

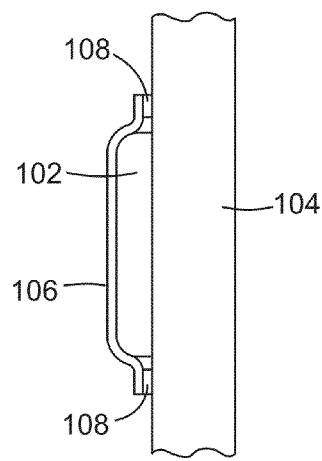
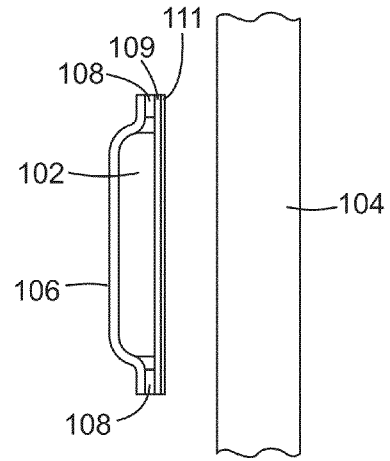
Fig. 9
Fig. 10

HIGH ANGLE REAR PROJECTION SYSTEM

BACKGROUND

Rear projection films are increasingly used in digital point of purchase signage. One of the challenges with using these rear projection films in point of purchase applications relates to the long throw distance of most projectors, typically measuring two to three times the long axis of the display. The expansion angle of the image emanating from the projector increases dramatically when the throw distance is shortened. When the entrance angle of the image projected onto the rear projection screen is increased, the light capture efficiency of the screen decreases rapidly. This phenomenon results in significant uniformity and view angle loss, and it can lead to an observable hot spot in the center of the image, which moves around as the viewer changes position, leading to poor useful view angle. Accordingly, a need exists for an improved rear projection screen, particularly for digital signage.

SUMMARY

A first system for projecting content at an angle to a rear projection screen, consistent with the present invention, includes a projector configured for projecting content and a rear projection screen for receiving the projected content at an angle and displaying the projected content. The rear projection screen comprises a protective film, a turning film having prisms facing toward the projector, a polymeric film, and a rear projection film or plate.

A second system for projecting content at an angle to a rear projection screen, consistent with the present invention, includes a projector configured for projecting content and a rear projection screen for receiving the projected content at an angle and displaying the projected content. The rear projection screen comprises a protective film, a turning film having prisms facing toward the projector with the prisms having a pitch between 5 microns and 80 microns, and a rear projection film or plate.

A third system for projecting content at an angle to a rear projection screen, consistent with the present invention, includes a projector configured for projecting content and a rear projection screen for receiving the projected content at an angle and displaying the projected content. The rear projection screen comprises a turning film having prisms facing away from the projector and a rear projection film or plate.

A fourth system for projecting content at an angle to a rear projection screen, consistent with the present invention, includes a projector configured for projecting content and a rear projection screen for receiving the projected content at an angle and displaying the projected content. The rear projection screen comprises a turning film having prisms facing away from the projector, a spacer, and a rear projection film or plate.

For any of these systems, the rear projection screen is configured such that when the projected content is displayed on the rear projection screen, the content has a substantially uniform appearance.

BRIEF DESCRIPTION OF THE DRAWINGS

The accompanying drawings are incorporated in and constitute a part of this specification and, together with the description, explain the advantages and principles of the invention. In the drawings.

FIG. 9 is a diagram of an alternative embodiment for a protective film on a rear projection screen; and FIG. 10 is a diagram of another alternative embodiment for a protective film on a rear projection screen.

DETAILED DESCRIPTION

Embodiments of the present invention include particular constructions of rear projection screens for at least substantially uniformly displaying content projected to the screen at an angle.

Figure 1:
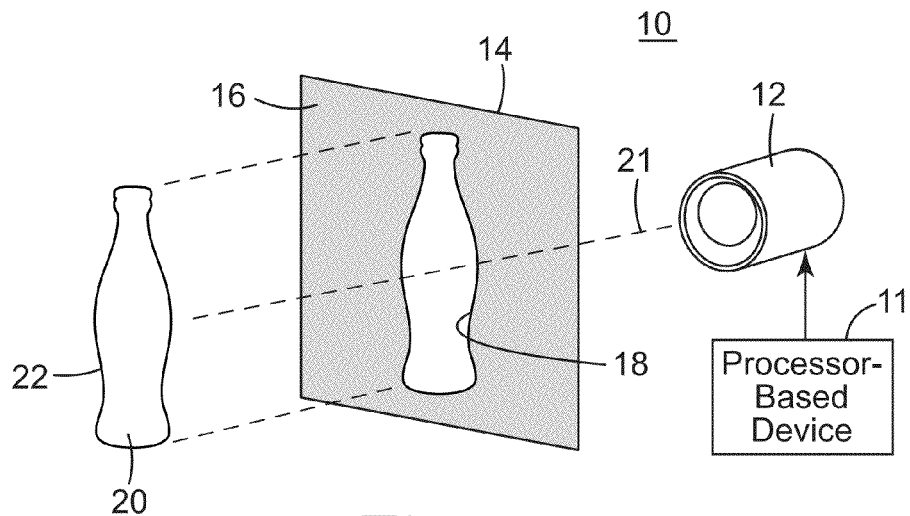
FIG. 1 is a perspective view of system having a shaped rear projection screen.

FIG. 1 is a perspective view of system 10 having a shaped rear projection screen. System 10 includes a projector 12 for projecting changeable electronic content, a processor-based device 11 for electronically providing content to projector 12, a virtual mask 14 having a projection area 18, and a shaped rear projection screen 20. Processor-based device 11 can implement virtual mask 14 in software to effectively block content in region 16 such that the displayed content, as represented by line 21, is projected within projection area 18 and substantially conforms to the shape of projection screen 20 as defined by its outer edge 22. Rear projection screen 20 can optionally include a shaped optically active light redirecting film, such as a Fresnel lens sheet, having a shape corresponding with outer edge 22.

Figure 2:
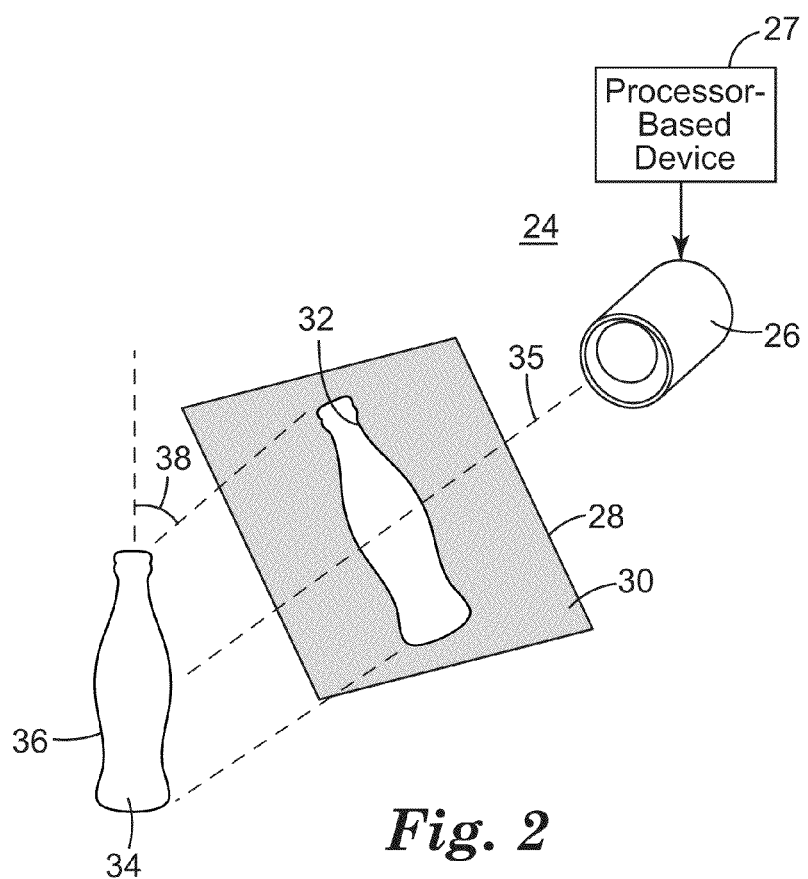
FIG. 2 is a perspective view of system having a shaped rear projection screen and having content projected at an angle to the film.

FIG. 2 is a perspective view of system 24 having a shaped rear projection screen and having content projected at an angle to the film. System 24 includes a projector 26 for projecting changeable electronic content, a processor-based device 27 for electronically providing content to projector 26, a virtual mask 28 having a projection area 32, and a shaped rear projection screen 34. Processor-based device 27 can implement virtual mask 28 in software to effectively block content in region 30 such that the displayed content, as represented by line 35, is projected within projection area 32 and substantially conforms to the shape of projection screen 34 as defined by its outer edge 36. Rear projection screen 34 can optionally include a shaped optically active light redirecting film, such as a Fresnel lens sheet, having a shape corresponding with outer edge 36. In system 24, the content is projected from projector 26 to projection screen 34 at an angle 38. Projecting the content at an angle allows, for example, locating the projector out of view or to the side or above objects so that the objects remain accessible.

In FIGS. 1 and 2, a bottle shape is used as the shape of the rear projection screen for illustrative purposes only. The rear projection screens can be shaped to conform to any desired content to be projected upon them. Although a virtual mask having a projection area to create the particular shape of the content is described above, a physical mask can also be used to create the particular shape of the content, or both a virtual and a physical mask can be used.

Figure 3:
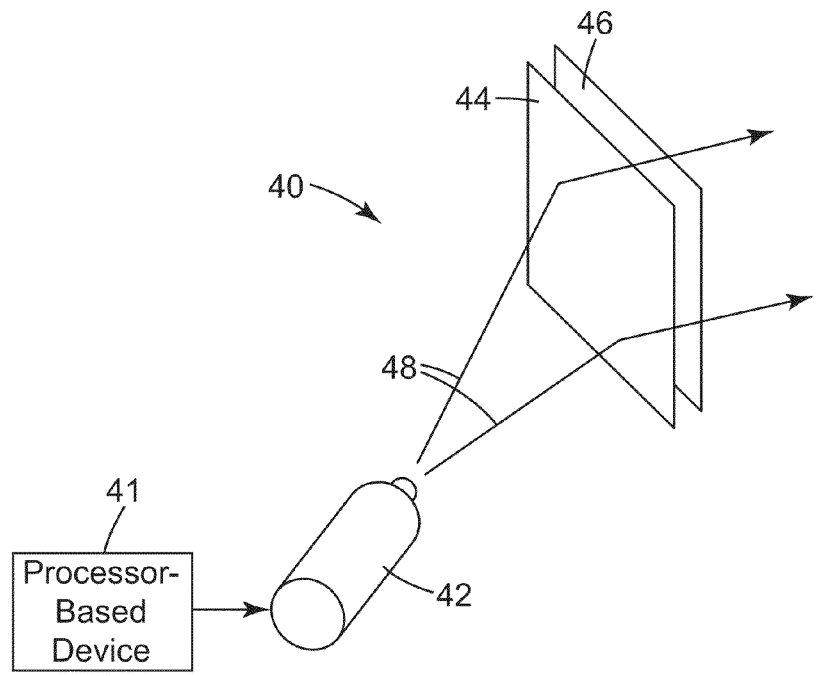
FIG. 3 is a perspective view of a system for high angle projection onto a rear projection screen.

FIG. 3 is a perspective view of a system 40 for high angle projection onto a rear projection screen. System 40 includes a projector 42 for projecting changeable electronic content, a processor-based device 41 for electronically providing content to projector 42, a turning film 44, and a rear projection screen 46. Projector 42 projects content to turning film 44 at an angle off the normal axis of rear projection screen 46, as represented by lines 48, and turning film 44 redirects the projected content through rear projection screen 46. Turning film 44 can be arranged with prisms facing in away from projector 42 or facing out toward projector 42.

High angle projection includes, for example, the projected content being projected within the angular range of 30 degrees to 80 degrees off the normal axis of the rear projection screen. A desired angular range for projection of content can be determined, for example, by a cut-off acceptance angle for high contrast rear projection screens that transmit on-axis light and at least partially reject off-axis light. For a desired luminance of the rear projection screen, the corresponding cut-off acceptance angle providing for such luminance can be selected. Other methods are also possible for selecting the desired angular range for projection of content.

Rear projection screen 46 can be a shaped screen, as described with respect to FIGS. 1 and 2, or a non-shaped screen. In particular, the screens for high angle projection can use a conventional outline of a screen (e.g., rectangular and not conforming to the projected content) or arbitrary shapes to enhance the visual appearance of the screen. Such shapes can be relatively simple such as the outline of circles, ovals, rectangles with rounded corners and the like, or more complex shapes such as stars, outlines of humans, outlines of animals, animated characters and the like. Acceptable shapes can also include outlines with interior features (e.g., holes) such that no projected content is visible within the interior features.

The combination of turning film 44 and rear projection screen 46 can include additional components or a particular construction, as explained below, to provide substantial uniformity of the projected content and reduce sparkle in the content. Sparkle is generally an exaggerated graininess in the image where small regions appear variably brighter and darker, which changes with viewing angle.

Rear projection screens, including shaped screens, are described in the following, all of which are incorporated herein by reference as if fully set forth: U.S. Pat. No. 7,923, 675; U.S. Pat. No. 6,870,670; and U.S. patent application Ser. No. 13/407,053, entitled "Shaped Rear Projection Screen with Shaped Fresnel Lens Sheet," and filed Feb. 28, 2012.

The projectors for projecting the changeable electronic content can include mercury bulb based projectors (e.g., X56 projector from 3M Company), LED based projectors (e.g., MP180 and MP410 projectors from 3M Company), and laser based projectors (e.g., SHOWWX+ scanning laser projector from MicroVision, Inc.). In some systems, use of a laser projector is advantageous because of its very long depth of focus, resulting in little degradation of the image quality from the top-to-bottom or side-to-side of the projected image.

Figure 4:
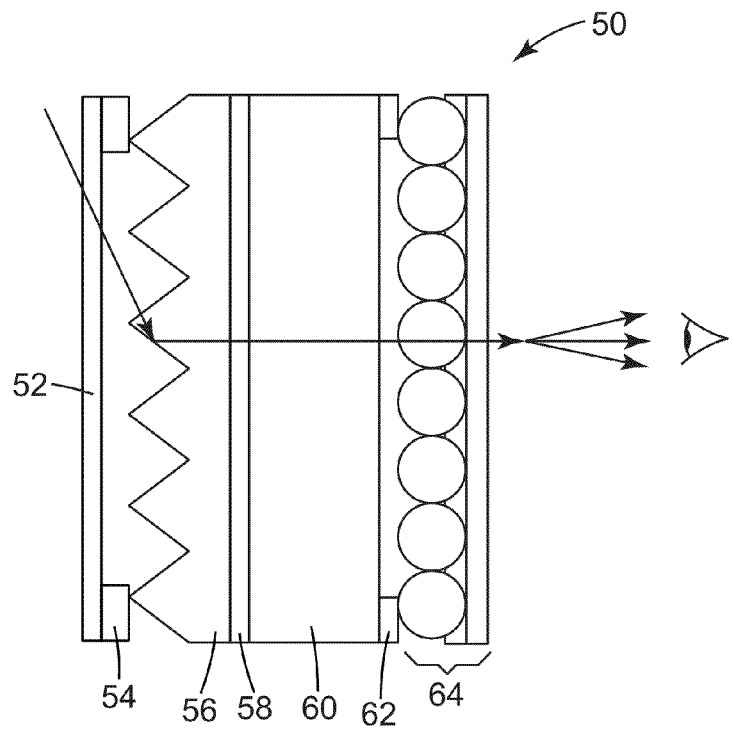
FIG. 4 is a side sectional view of a first rear projection screen for high angle projection.

FIG. 4 is a side sectional view of a first rear projection screen 50 for high angle projection. Rear projection screen 50 includes a protective film 52, a turning film 56, a spacer 60, and a rear projection film (or plate) 64. Protective film 52 is secured to turning film 56 with tape 54, which would be placed around the edges of those two films. Turning film 56 is secured to spacer 60 with an optically clear adhesive 58. Spacer 60 is secured to rear projection film 64 with tape 62, which would be placed around the edges of those two films. Rear projection film 64 can include an optically clear adhesive on the viewer side for securing the film to a support substrate such as a window. Turning film 56 is arranged with its prisms facing out toward the projector, and protective film 52 protects the prisms from damage. Spacer 60 typically has a thickness in the range of 10 mils to 30 mils, preferably about 20 mils for turning film prism pitches of 50 microns, and creates a space between turning film 56 and rear projection film 64 in order to help reduce sparkle in the displayed image. For a 5 micron prism pitch, the spacer typically has a thickness in the range of 1 mil to 10 mils. For an 80 micron prism pitch, the spacer typically has a thickness in the range of 20 mils to 30 mils. In some embodiments, the prisms can be coated onto thicker substrates to provide the required separation where the turning film substrate functions as the spacer.

Figure 5:
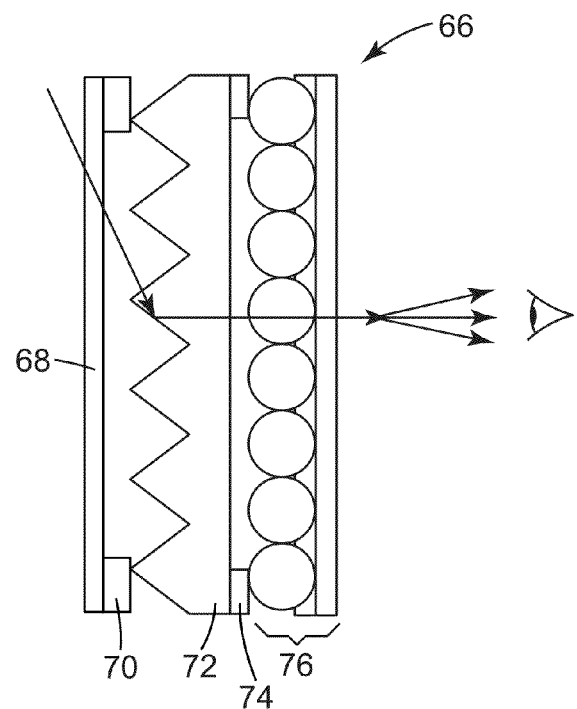
FIG. 5 is a side sectional view of second rear projection screen for high angle projection.

FIG. 5 is a side sectional view of a second rear projection screen 66 for high angle projection. Rear projection screen 66 includes a protective film 68, a turning film 72, and a rear projection film (or plate) 76. Protective film 68 is secured to turning film 72 with tape 70, which would be placed around the edges of those two films. Turning film 72 is secured to rear projection film 76 with tape 74, which would be placed around the edges of those two films. Rear projection film 76 can include an optically clear adhesive on the viewer side for securing the film to a support substrate such as a window. Turning film 72 is arranged with its prisms facing out toward the projector, and protective film 68 protects the prisms. This embodiment eliminates the need for spacer 60 used in rear projection screen 50 by using a turning film with a small pitch compared with turning film 56. In particular, turning film 72 has a prism pitch in the range of 5 microns to 80 microns. The thickness of tape 74 can be increased as the turning film pitch increases in order to provide for a larger space between turning film 72 and rear projection film 76 as the pitch increases.

Figure 6:
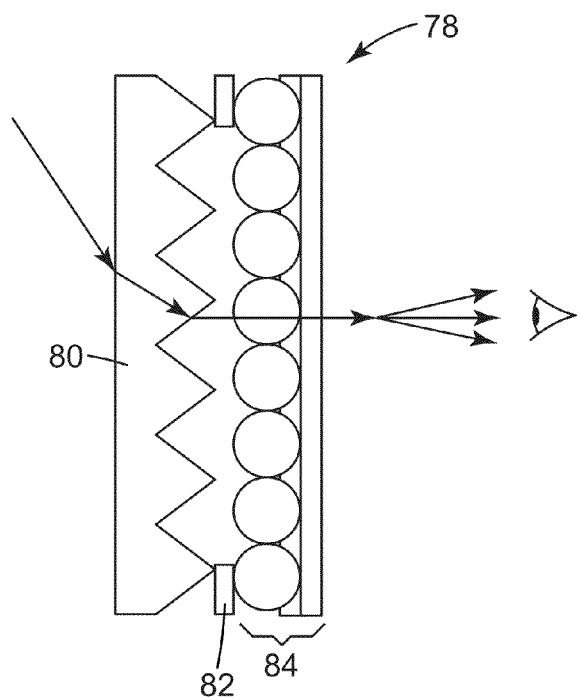
FIG. 6 is a side sectional view of a third rear projection screen for high angle projection.

FIG. 6 is a side sectional view of a third rear projection screen 78 for high angle projection. Rear projection screen 78 includes a turning film 80 and a rear projection film (or plate) 84. Turning film 80 is secured to rear projection film 84 with tape 82, which would be placed around the edges of those two films. Rear projection film 84 can include an optically clear adhesive on the viewer side for securing the film to a support substrate such as a window. Turning film 80 is arranged with its prisms facing in toward the rear projection film (away from the projector), which eliminates the need for a protective film over the prisms.

Figure 7:
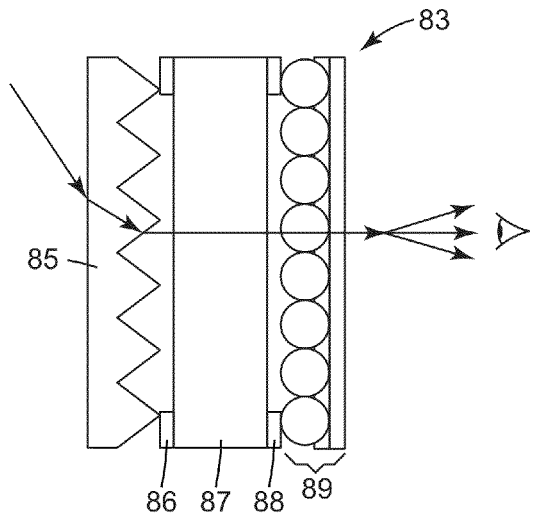
FIG. 7 is a side sectional view of a fourth rear projection screen for high angle projection.

FIG. 7 is a side sectional view of a fourth rear projection screen 83 for high angle projection. Rear projection screen 83 includes a turning film 85, a spacer 87, and a rear projection film (or plate) 89. Turning film 85 is secured to spacer 87 with tape 86, which would be placed around the edges of those two films. Spacer 87 is secured to rear projection film 89 with tape 88, which would be placed around the edges of those two films. Rear projection film 89 can include an optically clear adhesive on the viewer side for securing the film to a support substrate such as a window. Turning film 85 is arranged with its prisms facing in toward the spacer and rear projection film (away from the projector), which eliminates the need for a protective film over the prisms.

Figure 8:
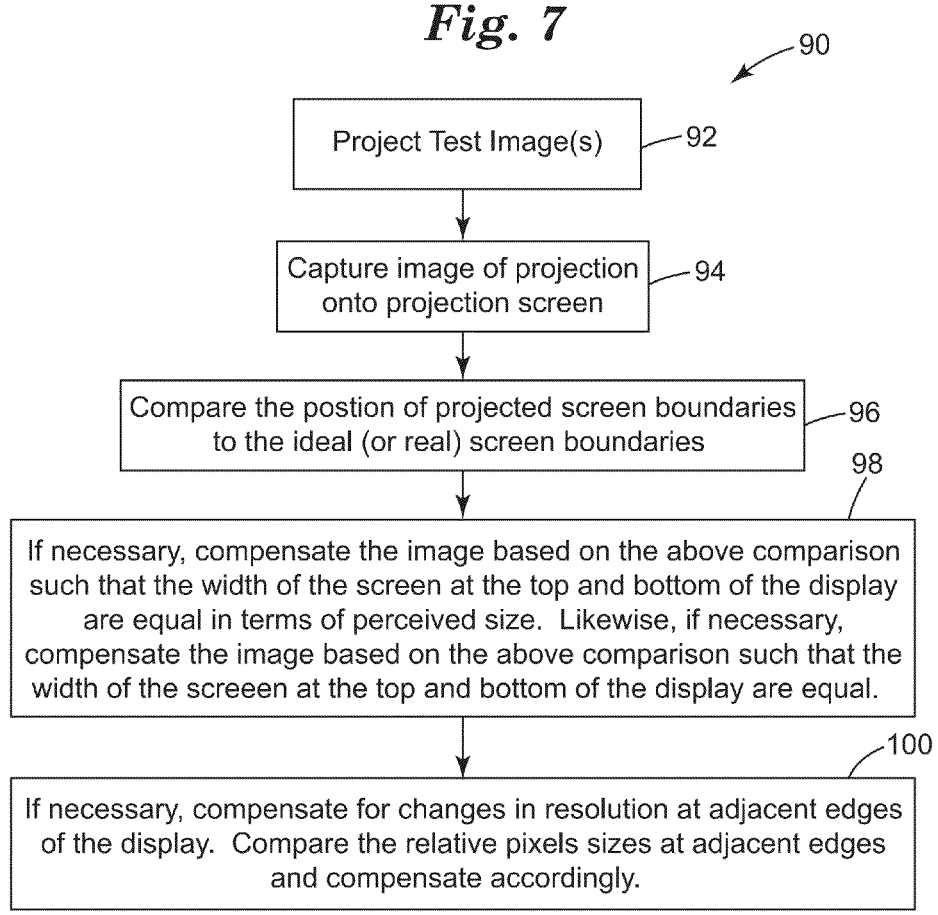
FIG. 8 is a flow chart of a method for image correction for high angle projection.

FIG. 8 is a flow chart of a method 90 for image correction for high angle projection. In method 90, one or more test images are projected at an angle onto a rear projection screen such as the screens described above (step 92). Examples of test images include a four dot grid, a moving or expanding single pixel, a moving or expanding column or row of light, or a grid test pattern. When projecting the test image, the focus of the projected image should be optimized for the rear projection screen being used. An image is captured of the content projected onto the rear projection screen (step 94). The position of the boundaries of the projected content is compared with ideal or desired screen boundaries (step 96). The comparison can be performed manually through a visual inspection or automatically through use of an image sensor and software processing.

If necessary, the projected image is compensated based upon the comparison in step 96 such that widths of the projected image at the top and bottom of the rear projection screen are at least substantially equal in terms of perceived size (step 98). If necessary, the compensation can also include compensating for changes in resolution at adjacent edges of the rear projection screen (step 100). This compensation for resolution changes can include comparing the relative pixel sizes at adjacent edges of the rear projection screen and compensating accordingly in order to resize the image to obtain at least a substantially uniform projected image. For example, the pixels can be resized in particular portions of the image in order to obtain uniformity. The pixels can also be adjusted to compensate for brightness non-uniformity due to changes of incidence angle to the rear projection screen.

The high angle rear projection screens can include optional coatings on the protective films or on the non-structured side of the turning films, such as hard coat, anti-fog, anti-fingerprint, easy to clean, and antireflection coatings.

The following are exemplary components and materials for implementing high angle rear projection screens. Polyethylene terephthalate (PET), polyethylene terephthalate glycol (PETG), or polycarbonate can be used for the spacer, as can other transparent materials such as transparent plastics or glasses, or an air gap. Alternatively, the spacer can be implemented with a polarizer.

The rear projection films or plates can be implemented with beaded or microreplicated non-beaded screens. An example of a beaded rear projection screen is the VIKUITI Rear Projection Film (available from 3M Company, St. Paul, Minn.). Examples of microreplicated non-beaded screens are disclosed in U.S. Pat. Nos. 7,184,210 and 7,057,810, both of which are incorporated herein by reference as if fully set forth.

The turning films can be implemented with microreplicated prism films, as further illustrated in the Example. The turning films can also be implemented with optically active light redirecting films (or plates) configured to function as a turning film for the projection systems.

The tape, or other ways to bond together the edges of the films, can be implemented with double-side adhesive films, thermoset adhesive films or dispensed thermoset liquids, and thermoplastic adhesive films or dispensed thermoplastic liquids.

The cover sheet (protective film) is typically a transparent film layer that provides protection for the rest of the film stack. A typical protective film is 1 mil PET film (available from DuPont Teijin Films, Hopewell, Va. This protective layer may not be needed in all screen constructions. The cover sheet may be adhered at the edges of the underlying adjacent film using RIM tape such as 3M 8150 tape (available from 3M Company, St. Paul, Minn.), a dispensed liquid clear or opaque adhesive which may be thermoset, or a UV cured adhesive. Only the edges of the cover sheet are adhered to the turning film, creating an air gap and preserving the optical properties of the turning film. This construction offers increased durability, an environmentally stable film stack, and easy cleaning with the turning film prisms protected by the cover sheet. The sealing adhesive may be contained entirely within the outline of the rear projection film, outside the edges of the rear projection film, or a combination of those two positions.

Alternatively as shown in FIG. 9, the cover sheet can be substantially larger than the turning film and rear projection film layers. In FIG. 9, a rear projection screen 102 corresponds with screens 50 and 66, or other screen with the prisms of the turning film facing toward the projector. In this case, a protective film 106 need not be adhered to the optical stack of screen 102. Rather, protective film 106 covers the optical stack and is adhered to the supporting transparent structure 104 for the rear projection film, such as a glass or plastic window, using tape 108 around a periphery of protective film 106.

As another alternative as shown in FIG. 10, the cover sheet can be substantially larger than the turning film and rear projection film layers. In FIG. 10, protective film 106 covers the optical stack and is adhered to a supporting transparent adhesive film 109 that extends beyond the edges of rear projection screen 102, using tape 108 around a periphery of protective film 106. This allows for the film stack to be completely sealed after fabrication, simplifying system set-up on supporting transparent structure 104 such as a glass or plastic window. In particular, the film stack can be secured to supporting transparent structure 104 using an optically clear (removable) adhesive 111.

The sealing adhesive for the protective film can be opaque, transparent, or of a particular color to coordinate, enhance, or otherwise make the displayed images more noticeable. While a rectangular protective film can be used, the protective film can be cut to the same outline as the shaped screen or cut to the same general outline and slightly larger (e.g., 0.25 inches larger) to seal the edges of the film stack to the mounting surface or the underlying adhesive coated film surface.

For any stack sealing method the stack edges can be preserved through alignment of the individual layers during stack assembly. In another method, the stack can be shaped after final assembly for any of these sealing methods by cutting through the edge seal layer. Various methods can be used to cut through the edge seal including use of a laser, shaped steel rule die, programmable knife cutting with one or more passes, or using other techniques known for cutting irregular shapes in relatively thick materials.

The protective film can include an adhesive layer on its inner surface in place of the edge sealing tape. The adhesive layer can be uniformly coated on the protective film layer and press against the turning film prism peaks without an adverse optical effect, or a second layer of optically clear film can be applied to the uniformly coated adhesive and selectively removed around the edges of the shaped protective screen in order to seal the edges as illustrated by tape 108.

The protective film can also be used to hold the film stack in position, eliminating the need for the edge sealing tape shown in FIGS. 4-6. In particular, the rear projection film can be adhered to a supporting surface such as a window. A turning film of the same size or shape as the rear projection film can then be aligned to the rear projection film and held in place by a protective film larger than the turning film and rear projection film shape.

EXAMPLE

These examples are merely for illustrative purposes only and are not meant to be limiting on the scope of the appended claims. Beaded rear projection screens in combination with various turning films were assembled and evaluated for sparkle, and image content corrections were made to high angle projection content.

Sparkle Reduction—Test Methods

All characterization was done with an MPro 410 DLP based projector, available from 3M Company, St. Paul, Minn. Various optical films were used to turn light. The projector angle was also varied for each film to optimally turn light through a VIKUITI Rear Projection Film (available from 3M Company, St. Paul, Minn.). Sparkle was quantified utilizing a Minolta A2 camera (available from Konica Minolta Holdings, Inc, Tokyo, Japan) in manual mode to maintain consistent exposure between pictures. Settings were chosen to ensure the test region was not oversaturated. The settings were as provided in Table 1.

TABLE 1

Exposure time: 1/60$^{th}$ second
F11
ISO 64
Camera was set 1 meter from screen, fixed on a tripod
Focus set to 1.1 meter as this was sharpest
Zoom was set to 35 +/1.5 millimeters for the range of the data set
Images were set to highest resolution, each image ~4 mb ImageJ Version 1.455 software was used to quantify sparkle of the images. Image J is open source software available from the National Institutes of Health (NIH), Bethesda, Md. A rectangular region was selected toward the center of the highest contrast region of the photo measuring approximately an area of 16,500 pixels, and then brightness standard deviation and mean brightness were measured within the rectangle. The standard deviation (Std Dev) was divided by the mean to normalize the data with respect to overall brightness, and this is reported as Normalized Standard Deviation (Std Dev/Mean).

Sparkle Reduction—Sample Preparation

Turning films were examined in two orientations, prisms facing out toward the projector, and prisms facing in toward the VIKUITI Rear Projection Film. The turning films contained 60 degree included-angle prisms with 18 micron and 50 micron pitch on 5 mil and 2 mil PET backings, respectively. The prisms had no canting and were symmetric.

Prisms consisted of microreplicated structures on one side of a roll of a clear 2 mil PET or 5 mil PET (refractive index ~1.64) film (MELINEX 454 film from DuPont Teijin Films, Hopewell, Va., 2 mil and 5 mil thicknesses). The microreplicated structures were formed from the substrate from a UV curable acrylate resin (refractive index ~1.49, 85% by weight PHOTOMER 6210 product available from Cognis, Monheim, Germany, and 15% by weight 1,6-hexanedioldiacrylate available from Aldrich Chemical Co, Milwaukee, Wis. and a photoinitiator 1% LUCIRIN TPO photoinitiator, BASF Corporation, Florham Park, N.J.) using a roll based tool. The microreplication tool used for this experimental example was a metallic cylindrical tool with one-dimensional structure (linearly extending prisms with a 50 micron pitch, and a second tool with 18 micron pitch). The one-dimensional structure was created by cutting into the copper surface of the cylindrical tool using a precision diamond turning machine. The resulting copper cylinder with precision prismatic cut features was chrome plated. The plating process of the copper master cylinder is used to promote release of cured resin during the microreplication process. The film replicate was made using an acrylate resin composition comprising acrylate monomers that was cast onto a PET support film and then cured against the precision patterned cylindrical tool using an LED based ultraviolet curing unit.

Various glossy inserts were utilized to separate the rear projection film and prisms to characterize any change in sparkle. The glossy inserts identified in Table 2 were used to examine various separations of rear projection film beads and turning film prisms.

TABLE 2

| | |
|---|---|
| 4 mil: | Mylar 400-A102: DuPont Teijin, Chester, VA |
| 5 mil: | Mylar 500-J102 PE: DuPont Teijin, Chester, VA |
| 7 mil: | GE 8010MC 112 Polycarbonate (PC): General Electric Company, Pittsfield, MA |
| 10 mil: | DE1-1D Polycarbonate: Bayer MaterialScience, Pittsburgh, PA |
| 20 mil: | PETG: Professional Plastics Inc, Fullerton, CA |

The total spacer thickness reported includes the PET substrate that the films were on for the prisms out configurations. The samples with 18 micron pitch were on a 5 mil PET substrate, and the samples with 50 micron pitch were on a 2 mil PET substrate. The material reported as the spacer is the additional glossy insert. Because the film turns light differently in each orientation the projector angle was varied. With prisms facing in toward the rear projection film, the MPro 410 projector was set to 57 degrees above normal. For prisms out (facing the projector), the 410 projector was set to 68 degrees above normal incidence. The films and spacers were all pressed together using a tool in order to minimize error from any inadvertent air gaps between the films.

Sparkle Reduction—Results

The sparkle of each different pitch turning film as a function of spacer thickness is shown in the data of Table 3. Sparkle was noticeably reduced in the samples as indicated by the Std/Mean values with lower Std/Mean values resulting in noticeably less sparkle.

TABLE 3

| Prism Pitch | Prisms facing inward or outward relative to rear projection film | Insert Material | Insert Total (mil) | Std/Mean |
|---|---|---|---|---|
| 18 | In | None | 0 | 0.19 |
| 18 | In | PET | 4 | 0.13 |
| 18 | In | PET | 5 | 0.13 |
| 18 | In | PC | 7 | 0.11 |
| 18 | In | PC | 10 | 0.11 |
| 18 | In | PETG | 20 | 0.10 |
| 18 | Out | None | 5 | 0.10 |
| 18 | Out | PC | 9 | 0.09 |
| 18 | Out | PC | 10 | 0.08 |
| 18 | Out | PET | 15 | 0.07 |
| 18 | Out | PETG | 25 | 0.06 |
| 50 | In | None | 0 | 0.14 |
| 50 | In | PET | 5 | 0.14 |
| 50 | In | PC | 7 | 0.14 |
| 50 | In | PC | 10 | 0.14 |
| 50 | In | PETG | 20 | 0.12 |
| 50 | Out | None | 2 | 0.17 |
| 50 | Out | PET | 6 | 0.16 |
| 50 | Out | PC | 7 | 0.14 |
| 50 | Out | PC | 12 | 0.12 |
| 50 | Out | PETG | 22 | 0.10 |

Image Correction

Projecting at high angles degrades the projected image quality because of issues such as depth of focus and image distortion. The following method was used to correct content for 60 degree high angle projection. A test image of a checkerboard was projected onto the projection screen. The projection screen was moved up until the center of the screen was located optimally in terms of image brightness and focus. Optimal location in terms of image brightness and focus was assessed subjectively. A Canon POWERSHOT SD780 image sensor (available from Canon Inc, Tokyo, Japan) was used to capture an image of the projected pattern. Using this captured image, pixels were identified which corresponded to (or appeared at) the four corners of the projection screen. Keystone distortion correction was performed on the image using these identified pixel locations as the new (or keystone corrected) image pixel corners. This correction was implemented using the PHOTOSHOP CS4 program (available from Adobe Systems Inc. San Jose, Calif.) using the transform/distort function keyed to the four points. The resulting image was improved since the entire image was not noticeably distorted.

This same technique was used on video content. In this case a sequence of still images was extracted from the video, keystone corrected, and then composited into a keystone corrected video clip. An alternative was to use the FINAL CUT PRO X program (available from Apple Inc. Cupertino, Calif.). This software keystone corrected a video sequence without separating the video into individual image frames. The keystone correction was most conveniently calculated from the (x,y) coordinates of the four points at the corners of a rectangular displayed image the same size or larger than the screen size. Arbitrarily shaped screens could also be keystone corrected using this technique.

The invention claimed is:

1. A system for projecting content at an angle to a rear projection screen, comprising:
   a projector configured for projecting content; and
   a rear projection screen for receiving the projected content at an angle off a normal axis of the rear projection screen and displaying the projected content, wherein the rear projection screen comprises as arranged in the following order:
   a protective film;
   a turning film having prisms facing toward the projector;
   a spacer; and
   a rear projection film or plate,
   wherein the projected content has a substantially uniform appearance when displayed on the rear projection screen,
   wherein the rear projection screen receives the projected content within an angular range of 30 degrees to 80 degrees off the normal axis.

2. The system of claim 1, wherein the rear projection screen is shaped and the projected content has a shape substantially matching the shape of the rear projection screen.

3. The system of claim 1, further comprising adhesive bonding the protective film to the turning film.

4. The system of claim 1, wherein the protective film covers the turning film, the spacer, and the rear projection film.

5. The system of claim 1, further comprising adhesive bonding the spacer to the rear projection film.

6. The system of claim 1, further comprising an optically clear adhesive securing the turning film to the spacer.

7. The system of claim 1, wherein the spacer comprises a polymeric film or plate.

8. A system for projecting content at an angle to a rear projection screen, comprising:
   a projector configured for projecting content; and
   a rear projection screen for receiving the projected content at an angle off a normal axis of the rear projection screen and displaying the projected content, wherein the rear projection screen comprises as arranged in the following order:
   a protective film;
   a turning film having prisms facing toward the projector with the prisms having a pitch between 5 microns and 80 microns; and
   a rear projection film or plate,
   wherein the projected content has a substantially uniform appearance when displayed on the rear projection screen,
   wherein the rear projection screen receives the projected content within an angular range of 30 degrees to 80 degrees off the normal axis.

9. The system of claim 8, wherein the rear projection screen is shaped and the projected content has a shape substantially matching the shape of the rear projection screen.

10. The system of claim 8, further comprising adhesive bonding the protective film to the turning film.

11. The system of claim 8, further comprising adhesive bonding the turning film to the rear projection film.

12. A system for projecting content at an angle to a rear projection screen, comprising:
   a projector configured for projecting content; and
   a rear projection screen for receiving the projected content at an angle off a normal axis of the rear projection screen and displaying the projected content, wherein the rear projection screen comprises as arranged in the following order:
   a turning film having prisms facing away from the projector; and
   a rear projection film or plate,
   wherein the projected content has a substantially uniform appearance when displayed on the rear projection screen,
   wherein the rear projection screen receives the projected content within an angular range of 30 degrees to 80 degrees off the normal axis.

13. The system of claim 12, wherein the rear projection screen is shaped and the projected content has a shape substantially matching the shape of the rear projection screen.

14. The system of claim 12, further comprising adhesive bonding the turning film to the rear projection film.

15. A system for projecting content at an angle to a rear projection screen, comprising:
   a projector configured for projecting content; and
   a rear projection screen for receiving the projected content at an angle off a normal axis of the rear projection screen and displaying the projected content, wherein the rear projection screen comprises as arranged in the following order:
   a turning film having prisms facing away from the projector;
   a spacer; and
   a rear projection film or plate,
   wherein the projected content has a substantially uniform appearance when displayed on the rear projection screen,
   wherein the rear projection screen receives the projected content within an angular range of 30 degrees to 80 degrees off the normal axis.

16. The system of claim 15, wherein the rear projection screen is shaped and the projected content has a shape substantially matching the shape of the rear projection screen.

17. The system of claim 15, further comprising adhesive bonding the turning film to the spacer.

18. The system of claim 15, further comprising adhesive bonding the spacer to the rear projection film.

19. The system of claim 15, wherein the spacer comprises a polymeric film or plate.

* * * * *